United States Patent Office 3,538,180
Patented Nov. 3, 1970

3,538,180
OLEFIN CONVERSION AND
CATALYST THEREFOR
Robert E. Reusser, Bartlesville, Okla., assignor to Phillips
Petroleum Company, a corporation of Delaware
No Drawing. Filed Apr. 3, 1967, Ser. No. 627,652
Int. Cl. C07c 3/62
U.S. Cl. 260—683
9 Claims

ABSTRACT OF THE DISCLOSURE

Acyclic monoolefins are converted to other olefins having different molecular weights by contact with an olefin reaction catalyst active for disproportionating propylene into ethylene and butene comprising alumina promoted with a compound of molybdenum, tungsten or rhenium and further treated with a polyene having about 4-18 carbon atoms per molecule and containing 2 to about 9 double bonds.

---

This invention relates to the conversion of acyclic monoolefin hydrocarbons and to a catalyst for such conversion. In one aspect, this invention relates to the olefin reaction. In another aspect, it relates to the conversion of acyclic monoolefins to other olefins having different molecular weights by contact with an olefin reaction catalyst comprising alumina promoted with a compound of molybdenum, tungsten, or rhenium and further treated with a polyene having from about 4-18 carbon atoms per molecule and containing from 2 to about 9 double bonds.

The olefin reaction is defined as a process for the catalytic conversion over a catalyst of a feed comprising one or more ethylenically unsaturated compounds to produce a resulting product which contains at least ten per cent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by the following reactions:

(1) The disproportionation of an acyclic monoolefin having at least three carbon atoms into other acyclic monoolefins of both higher and lower number of carbon atoms; for example, the disproportionation of propylene yields ethylene and butenes;

(2) The conversion of an acyclic monoolefin having three or more carbon atoms and a different acyclic monoolefin having three or more carbon atoms to produce different acylic olefins; for example, the conversion of propylene and isobutylene yields ethylene and isopentene;

(3) The conversion of ethylene and an internal acyclic monoolefin having four or more carbon atoms to produce other olefins having a lower number of carbon atoms than that of the acyclic monoolefin; for example, the conversion of ethylene and 4-methylpentene-2-yields 3-methylbutene-1 and propylene.

It is an object of this invention to provide a method for the conversion of olefins. Another object of this invention is to provide a catalyst for the conversion of olefins. Still another object of this invention is to provide a method for converting olefins to other olefins of desired molecular weight in good yield. Still another object is to provide a method for improving the selectivity of a molybdenum, tungsten, or rhenium promoted alumina catalyst for the conversion of olefins. Still another object of this invention is to provide a method for quenching the propensity of such promoted alumina olefin reaction catalysts for polymerizing or isomerizing the olefin which is contacted with such catalyst. Other aspects, objects and advantages of this invention will be apparent to one skilled in the art upon reading the disclosure, including a detailed description of the invention.

According to the process of this invention, acyclic monoolefins are converted by the olefin reaction under appropriate reaction conditions, including conditions of temperature, pressure and residence time, to produce products of the olefin reaction, with a catalyst consisting essentially of alumina, promoted by treatment with an oxide, or compound convertible to an oxide upon calcination, of molybdenum, tungsten, or rhenium; a sulfide or hexacarbonyl of tungsten or molybdenum; or an alkali metal salt, ammonium salt, alkaline earth metal salt, or bismuth salt of phosphomolybdic acid; and further treated with an alicyclic or acyclic hydrocarbon having from about 4 to about 18 carbon atoms per molecule and containing from 2 to about 9 double bonds. The polyene is added after calcination of the catalyst and preferably just prior to utilization of the catalyst in the olefin reaction.

The catalyst used in the invention comprises an oxide of aluminum. Any conventional catalytic grade of alumina including the eta or gamma forms can be used. When the promoter is molybdenum oxide, the catalyst is frequently additionally promoted by an oxide of cobalt. The catalysts of my invention can contain other materials which do not substantially promote undesirable side reactions. For example, the alumina base can contain silica, magnesia, titania, or other bases in amounts which do not change the essential characteristics of the reaction. For example, small amounts of silica or magnesia can be used to make the base more resistant to surface area reduction by contact with moisture. Suitable supports include 100 percent alumina, silica-alumina wherein the amount of silica is up to about 25 percent, of the total support; magnesia-alumina wherein the amount of magnesia is up to about 20 percent of the total support; and titania-alumina where the amount of titania is up to about 85 percent of the total support.

Because it is generally the major portion of the catalyst, the alumina is, for convenience, referred to as the catalyst support. Similarly, the molybdenum, tungsten, and rhenium compounds are referred to as promoters. It should be understood, however, that the catalytic agent is the reaction product resulting from the admixture of alumina and at least one suitable promoter material under activating conditions.

The composite catalyst can be prepared by any conventional method such as dry mixing, coprecipitation or impregnation. For example, a 10–100 mesh alumina (having a 178 m.²/g. surface area and a 107 A. pore diameter) is impregnated with an aqueous solution of a molybdenum compound, such as ammonium molybdate, which is convertible to the oxide upon calcination. A commercially available catalyst comprising 12.8:3.8:83.4

$$MoO_3—CoO—Al_2O_3$$

having a 208 m.²/g. surface area and a 96 A. pore diameter is also satisfactory. Commercial molybdenum or cobalt-molybdate on alumina catalyst, which catalysts generally contain between 8 and 15 percent by weight of the promoter, are satisfactory.

Sufficient promoter is used to obtain the desired activity. Since the molybdenum, tungsten and rhenium compounds usually are more expensive than the support material, unnecessarily large amounts are ordinarily not used. Generally, the finished catalyst base contains from 0.1 percent to 30 percent by weight of the selected promoter. However, larger amounts can be used. In most instances, a preferred amount of the promoter is from about 1 percent to 20 percent. Cobalt oxide can be present in the molybdenum promoted catalyst in the range of 0 to about 20 weight percent of the total catalyst, preferably about 1 to 5 percent when present.

Before use in the olefin reaction, the above-described oxide-promoted or phosphomolybdate-promoted catalysts are activated by heat treatment. The catalysts are subjected to 700–1600° F., preferably 900–1400° F., for 0.5–20 hours or longer. Generally, the longer activation periods are used with lower temperatures and shorter activation periods with higher temperatures. At temperatures of about 1100° F. and lower, long activation times, e.g., 50 hours or more, are not harmful to activity. It is preferred that the catalyst treatment be carried out in an atmosphere of flowing non-reducing gas. Activation in the presence of an atmosphere of a free oxygen-containing gas, e.g., air, is preferred, but a less active but effective catalyst for the olefin reaction can be obtained by activation with an inert gas. Suitable gases for such an activation treatment include nitrogen, gas from an inert atmosphere generator (a conventional refinery apparatus in which natural gas or other condensible hydrocarbon gas is burned with a stoichiometric quantity of air, yielding an essentially nonreducing gas mixture), substantially nonreducing flue gases, carbon dioxide, helium, argon, crypton, neon, zenon, and radon. The presence of reducing gases during activation should be avoided.

Molybdenum or tungsten sulfide-promoted catalysts are activated in a conventional and similar manner except oxygen-containing activating gases are avoided.

Significant amounts of moisture in the activation gas, especially at higher temperatures, are harmful to the catalyst by reducing surface area.

Olefins which can be converted in the presence of the catalyst of the invention are acrylic monoolefins having from 3 to 30 carbon atoms per molecule; and mixtures of ethylene and these olefins.

Some examples of acrylic monoolefins which can be used in this invention include propylene, 1-butene, isobutent, 2-butene, 1-pentene, 2-pentene, 1-hexene, 2-heptene, 1-octene, 2-nonene, 1-dodecene, 2-tetradecene, 1-hexadecene, 2-methyl-1-butene, 2-methyl-2-butene, 3-methyl-1-butene, 4-octene, 3-eicosene and 3-heptene, and the like, and mixtures thereof.

The process of this invention can be carried out either batchwise or continuously, using a fixed catalyst bed, or a stirrer-equipped reactor or other mobile catalyst contacting process as well as any other well-known contacting technique. Preferred reaction conditions, e.g., temperatures, pressure, flow rates, etc., vary somewhat depending upon the specific catalyst composition, the particular feed olefin, desired products, etc. The process is carried out at about 150–500° F., preferably 250–400° F., at pressures in the range of 0–1500 p.s.i.g. Although the olefin reaction of this invention is essentially independent of pressure, for most economical operation, considering combination with other steps of a complete plant operation, including, for example, product separation and recovery, a pressure range of about 200–600 p.s.i.g. can be used conveniently.

With a fixed bed reactor and continuous flow operation, hourly space velocities in the range of about 0.5 to 1000 parts by weight of hydrocarbon feed per part by weight of catalyst per hour are suitable, with excellent results having been obtained in the range of 1 to 200.

The olefin reaction process can be carried out either in the presence or absence of a diluent. Diluents comprising paraffinic and cycloparaffinic hydrocarbons can be employed. Suitable diluents are, for example, propane, cyclohexane, methylcyclohexane, normal pentane, normal hexane, isooctane, dodecane, and the like, or mixtures thereof, including primarily those paraffins and cycloparaffins having up to 12 carbon atoms per molecule. The diluent should be non-reactive under the conditions of the olefin reaction.

The polyenes which are applicable for use as catalyst treating agents in the present invention are alicyclic and acyclic hydrocarbons having from about 4 to about 18 carbon atoms per molecule and containing from 2 to about 9 double bonds. They can be branched or unbranched. The alicyclic polyenes can be monocyclic or polycyclic. Some examples of suitable polyenes are 1,3-cyclopentadiene; 1,5-cyclooctadiene; 5-methyl-1,3-cycloheptadiene; 1,3-cyclooctadiene; 1,4-cyclohexadiene, cyclooctatetraene; 1,5,9-cyclododecatriene; 1,4,7-cyclopentadecatriene; bicyclo[3.3.0]-2,7-octadiene; bicyclo[3.2.1]-2,6-octadiene; azulene; cyclooctadecanonaene; cyclononatetraene; bicyclo[2.2.1]hepta-2,5-diene; diphenylfulvene; norbornene; norbornadiene; butadiene; isoprene; 1,5-hexadiene; 3-methyl-1,4,6-heptatriene; 2,4,6-octatriene; 1,3,7-octatriene; 9-propyl-1,3,5,7-dodecatetraene; 1,3,6-cyclooctatriene; and the like, and mixtures thereof.

The olefin reaction catalysts are treated with the polyenes using conventional contacting techniques such as impregnation with or without a diluent. For example, a solution of the polyene in an inert solvent more volatile than the polyene, such as a hydrocarbon solvent, can be used to contact the catalyst followed by evaporation of the volatile solvent at any convenient temperature below the decomposition temperature of the polyene. Alternatively, the catalyst can be treated by blending the polyene with the feed during the initial contact of the of the feed with the catalyst. Prior to treatment with the polyene, the catalyst should be otherwise fully activated such as by calcining in air or other suitable gas at an appropriate temperature. Care should be taken to avoid the introduction of air, water vapor, or other known poisons to the catalyst during the catalyst treatment with the polyene. After the treatment of the catalyst with the selected polyene, the catalyst is ready for use in the olefin reacion process. Ordinarily, the polyenes are added to the catalyst in amounts of at least 0.1 weight percent up to about 50 weight percent based on the catalyst. However, if desired, larger amounts can be used.

Other than the treatment of the catalyst with the polyene, the olefin reaction is carried out according to conventional techniques using conditions of operation which are known to be suitable for the specific olefin reaction catalyst utilized.

The invention can be further illustrated by the following examples.

EXAMPLE I

Octene-1 was disproportionated over a molybdena-alumina catalyst which had been treated with azulene and with 1,5-cyclooctadiene. For purposes of comparison, results obtained with an untreated catalyst were also obtained.

The catalyst utilized was a molybdena-alumina catalyst containing about 13 weight percent $MoO_3$, and which had a surface area of 325 m.$^2$/g., a pore volume of 0.52 ml./g., a pore diameter of 64 angstroms, and which had been activated for 5 hours at 1000° F. in air before use.

The cyclic polyenes were used to impregnate the catalyst by dissolving the polyene in 50 ml of pentane, slurrying it with about 15 grams of the above activated catalyst, and evaporating the pentane at about 100° C. and 30 mm. Hg. For the control test, a 15 g. portion of the catalyst was similarly treated except the pentane contained no polyene agent.

The olefin disproportionation runs were carried out in a vessel upon which was mounted a small column containing the treated catalyst. A reflux condenser was mounted on the column. About 30 ml. of octene-1 was charged into the vessel, heated to boiling, and the vapors were allowed to contact the catalyst and reflux back into the column and vessel. Heavier materials accumulated in the reaction vessel while ethylene (and perhaps some propylene) were allowed to vent from the system. The reaction was continued until the pot temperature had reached about 175° C.

At the completion of the reaction period, the contents of the reaction vessel were analyzed by gas-liquid chromatography. The results of the runs are shown in the following table:

TABLE I

| | Run No. | | | | |
|---|---|---|---|---|---|
| | 1 | 2 | 3 | 4 | 5 |
| Treating agent | (¹) | (²) | (²) | (³) | (³) |
| Concentration, wt. percent of catalyst | | 1 | 2 | 1 | 2 |
| Product distribution, mole percent of olefins: | | | | | |
| $C_3$ | | 4.37 | | 4.05 | 2.40 |
| $C_4$ | 6.21 | | | 4.48 | 3.66 |
| $C_5$ | 4.78 | | | 2.19 | 1.61 |
| $C_6$ | 3.78 | | | 1.69 | 1.27 |
| $C_7$ | 3.18 | | | 3.77 | 4.13 |
| $C_8$ | (⁴) | (⁴) | (⁴) | (⁴) | (⁴) |
| $C_9$ | 12.38 | 16.36 | 9.39 | 14.23 | 16.15 |
| $C_{10}$ | 7.93 | 4.20 | 1.32 | 4.20 | 3.74 |
| $C_{11}$ | 7.22 | 2.88 | 1.27 | 4.19 | 4.85 |
| $C_{12}$ | 13.23 | 7.00 | 3.23 | 12.42 | 12.16 |
| $C_{13}$ | 18.75 | 20.20 | 12.56 | 24.68 | 19.98 |
| $C_{14}$ | 10.61 | 40.53 | 71.01 | 17.82 | 23.61 |
| $C_{16}$ | 11.93 | 4.49 | 1.19 | 6.33 | 6.48 |
| Total | 100.00 | 100.03 | 99.97 | 100.05 | 99.94 |

¹ None. ² Azulene. ³ 1,5-COD. ⁴ Feed.

The primary disproportionation product of octene-1 is a $C_{14}$ olefin. An undesirable byproduct of the reaction is a simple $C_{16}$ olefin dimer. Examination of the table above shows that the presence of the cyclic polyene catalyst modifiers increased the quantity of the principal olefin $C_{14}$ disproportionation product and also greatly reduced the quantity of the $C_{16}$ dimer.

EXAMPLE II

In another series of runs, catalysts were treated with isoprene and 1,5-hexadiene and utilized in the octene-1 disproportionation reaction.

An alumina-supported catalyst containing 11.0 weight percent $MoO_3$, 3.4 weight percent CoO and 85.6 weight percent $Al_2O_3$, in the form of ⅛ inch extrudates was activated for 4 hours at 1000° F. in flowing air.

In a series of runs, a 12–14 g. portion of this catalyst was charged into the apparatus of Example I. The reaction was continued until the liquid temperature reached 175–188° C. Analysis by gas-liquid chromatography showed the $C_{14}$ olefin content which is a measure of the selectivity of the reaction. The data and results are shown in the following table.

TABLE II

| | Run No. | | | | |
|---|---|---|---|---|---|
| | 6 | 7 | 8 | 9 | 10 |
| Treating agent | (¹) | (²) | (²) | (³) | (³) |
| Treating time, min | (¹) | 5 | 3½ | (⁶) | 5 |
| Treating technique | (¹) | (⁴) | (⁵) | (⁶) | (⁷) |
| $C_{14}$ product, mole percent | 35.18 | 71.86 | 59.82 | 65.92 | 64.76 |

¹ None.
² 1,5-hexadiene.
³ Isoprene.
⁴ 10 ml. 1,5-hexadiene was added to the 30 ml. octene-1 and the mixture refluxed for 5 minutes. The hexadiene was then allowed to distill off before refluxing of the octene-1 was resumed.
⁵ Same as ⁴ except the hexadiene mixture refluxed only 3½ minutes.
⁶ After the 30 ml. of octene-1 was charged to the reaction vessel, 10 ml. of isoprene was poured down through the catalyst into the vessel and immediately distilled off.
⁷ The catalyst bed was submerged in isoprene for 5 minutes. The isoprene was then removed by distillation and the refluxing of octene-1 was begun.

The data in Table II show that 1,5-hexadiene and isoprene are also effective in increasing the selectivity of the octene-1 disproportionation reaction. Much more $C_{14}$ olefins were found in the products obtained with the treated catalyst.

That which is claimed is:

1. In the process of converting an acyclic monoolefin in the olefin reaction wherein at least one such monoolefin is contacted with a catalyst active for disproportionating propylene into ethylene and butene comprising alumina and a promoting amount of a compound of tungsten, molybdenum or rhenium under conditions, including conditions of temperature, pressure and contact time, suitable for obtaining a product of the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, the improvement comprising depositing a polyene on the surface of the catalyst prior to utilizing the catalyst in the olefin reaction process.

2. The process of claim 1 wherein the catalyst is contacted with at least about 0.1 weight percent, based on the catalyst, of a polyene having about 4 to 18 carbon atoms per molecule and containing 2 to about 9 double bonds.

3. The process of claim 1 wherein 1-octene is disproportionated to produce ethylene and a $C_{14}$ olefin.

4. The process of claim 1 wherein the catalyst comprises alumina promoted by about 0.1 to 30 weight percent of molybdenum oxide, based on the total catalyst.

5. The process of claim 1 wherein the polyene is azulene.

6. The process of claim 1 wherein the polyene is cyclooctadiene.

7. The process of claim 1 wherein the temperature is in the range of about 150 to 500° F., the pressure is in the range of 0 to about 1500 p.s.i.g. and the contact time is in the range of about 0.5 second to 10 hours.

8. The process of claim 1 wherein the catalyst is contacted with at least about 0.1 weight percent, based on the catalyst, of a polyene having about 4 to 18 carbon atoms per molecule and containing 2 to about 9 double bonds, and wherein said monoolefin is selected from acyclic monoolefins having from 3 to 30 carbon atoms per molecule and mixtures thereof with ethylene.

9. The process of claim 8 wherein the temperature is in the range of about 150 to 500° F.

References Cited

UNITED STATES PATENTS

| 3,261,879 | 7/1966 | Banks | 260—683 |
| 3,365,513 | 1/1968 | Heckelsberg | 260—683 |

DELBERT E. GANTZ, Primary Examiner

C. E. SPRESSER, Assistant Examiner

U.S. Cl. X.R.

252—458, 465